United States Patent Office
3,493,595
Patented Feb. 3, 1970

3,493,595
METHOD OF PURIFYING ORGANOSILOX-
ANE POLYMERS EMPLOYING GAS-LIQ-
UID EXTRACTION
Rudolf Strasser, Siegfried Nitzsche, and Ferdinand Gerstner, Burghausen, Upper Bavaria, Germany, assignors to Wacker-Chemie G.m.b.H., Munich, Bavaria, Germany
No Drawing. Filed July 3, 1967, Ser. No. 650,584
Int. Cl. C07f 7/18, 7/20
U.S. Cl. 260—448.2                                    6 Claims

ABSTRACT OF THE DISCLOSURE

Organosiloxane oils prepared by hydrolysis of one or more organohalogenosilanes are purified by extraction with water vapor.

---

This invention relates to a novel and useful method for removal of hydrogen halide and other volatile components from organopolysiloxane oils which have been prepared by hydrolysis and condensation of organohalogenosilanes.

Background of the invention

The commercial preparation of polymeric organosiloxane oils and resins is based on the hydrolysis of organohalogenosilanes and the concurrent and subsequent condensation of the resulting silanols. The hydrolysis reaction can be illustrated by the equation:

$$R_{4-n}SiX_n + nH_2OR_{4-n}Si(OH)_n + nHX$$

It can be seen that large volumes of hydrogen halide are by-produced. Part of the hydrogen halide will dissolve in the reaction products. For example, hydrolysis of a mixture of $Me_2SiCl_2$ and $Me_3SiCl$ to produce commercial siloxane oils of the formula $Me_3SiO(Me_2SiO)_xSiMe_3$, generally results in 40 to 120 g. of hydrogen chloride dissolved in each liter of hydrolyzate. The hydrolyzate containing this amount of hydrogen chloride often cannot be used because of its corrosive properties and the hazards resulting from evolution of the hydrogen chloride. Accordingly, it is desirable to remove the dissolved hydrogen chloride from the hydrolyzate before further use. Since it is desired to avoid formation of high molecular weight polymers which may be difficult to handle in further processing or which must be even discarded it is obviously beneficial to remove the hydrogen chloride as soon and as completely as is practical. In any case, a stable polymeric fluid requires removal of the hydrogen chloride. Thus, a method for removal of hydrogen halide from the hydrolyzate produced by hydrolysis of organohalosilanes is a prime object of this invention.

In addition to the presence of hydrogen halides in the hydrolyzate, it is known that low molecular weight linear and cyclic species of siloxanes are produced when organohalosilanes are hydrolyzed. The hydrolysis of dialkylhalosilanes such as $Me_2SiCl_2$ and mixtures of $Me_2SiCl_2$ with any one or more of $MeSiCl_3$, $Me_3SiCl$, $MePhSiCl_2$, $Ph_2SiCl_2$, and/or $MeViSiCl_2$ will produce organopolysiloxane oils which cannot be distilled in addition to the low molecular weight distillable products. The low boiling products are usually not desired in mixture with the non-distillable oils, hence are removed partially or entirely. The hydrolysis reaction is generally carried out in the presence of organic solvents having relatively low boiling points. Such solvents as toluene, xylene, diethylether, dibutylether, trichloroethylene, tetrahydrofuran, dioxane and alcohols are used together with water in the hydrolysis of the organohalosilanes. These organic solvents must also be removed from the reaction product before the siloxane oils can be used.

The removal of the various by-products and impurities from the hydrolysis and condensation reaction product has been accomplished in the past by a number of techniques. The hydrogen halide produced has been removed in batch-wise fashion by repeated washing with water which may contain basic compounds such as sodium carbonate, ammonium and quinone in small quantities. To separate the organopolysiloxane oil from the aqueous phase, the oil is taken up in organic solvents which are immiscible with water and which are specifically lighter or heavier than water. The organopolysiloxane oil must then be separated from the solvent in a further procedure.

Improved partially continuous processing of the hydrolyzate has been suggested. The continuous process involves washing the hydrolyzate with a saline solution. However, certain SiH containing polysiloxane oils with an acid count of 0.04 cannot be washed by a continuous procedure. Further, a large commercial expenditure is necessary to maintain the concentration of the saline solution at the operable levels.

A further proposed method for treating the hydrolyzate involves using tertiary alcohols for removal of the hydrogen halide from the reaction mixture. The hydrogen halide reacts with the tertiary alcohol to produce a tertiary alkyl halide which can then be removed from the reaction mass. However, the removal of the excess alcohol and the alkyl halide which is formed is a further problem encountered in this method.

It has also been suggested that the acid reaction products of the reaction of organohalosilanes with water and other hydroxyl group containing compounds can be removed by using a direct current or a countercurrent of inert gas at elevated temperature. However, this "blowing out of the acid reaction products" does not efficiently remove the hydrogen chloride because the dimethylsiloxane polymer serving as a starting material for silicone rubber, cosmetics, etc., can contain not more than about one part by weight of HCl per million parts by weight of polymer. The inefficient extraction of the inert gases requires large, acid-proof and expensive apparatus to carry out the procedure. Further, the organic products must be reclaimed.

It is an object of this invention to introduce a simple and inexpensive method for removing the various undesirable by-products, solvents, and low molecular weight siloxane species from hydrolyzates produced by hydrolysis of organohalosilanes. A further object is a commercially attractive method for producing organopolysiloxane oils of high purity. Further objects and advantages of this invention are disclosed in or will be apparent from the disclosure and claims following.

The present invention is a method for removal of hydrogen halides, low boiling siloxanes, and/or organic solvents from organopolysiloxane oils produced by hydrolyzing organohalosilanes characterized in that the hydrolysis product is subjected to water vapor extraction.

In addition to water vapor, certain other hydroxyl-group containing compounds such as methanol and ethanol in their gaseous state can be used herein. Water vapor, however, is preferred because of its low price and its exceptional extracting action.

The method of the present invention has the advantage that in one step the organopolysiloxane oils can be freed of hydrogen halides, low boiling siloxanes and/or possibly organic solvents which may be present and that only traces of hydrogen chloride will still be present in the purified product.

Becaues of the superior extractive action of the water vapor, essentially neutral endproducts can be obtained using very little energy and small-volume apparatus.

The organopolysiloxane oils remain in the extraction apparatus for only about 20 minutes, hence the purification is very economical to carry out, i.e. without noteworthy continued condensation of the organopolysiloxane oils.

All organopolysiloxanes which have been obtained from any desired hydrolysis process of organohalosilanes or mixtures of these with any other silanes which has been accomplished with at least the requisite stoichiometric quantity of water, possibly in the presence of organic solvents such as ether, toluenes, xylenes, alcohols, etc. can be used in the method of the present discovery as long as the products obtained still possess a fluid character at the extraction temperature, i.e. viscosities in the range of 20 to 2,500 cs. at 25° C.

The low boiling siloxanes include all those siloxanes which are volatile with water vapor, especially those siloxanes which will volatilize after a two-hour treatment of the organopolysiloxane oil at 180° to 250° C. in a dry air-circulating oven.

The quantity of water vapor which is used is between 200 g. to 10 kg. for each kg. of hydrolyzate, preferably 500 g. to 2 kg./kg. of hydrolyzate. A greater quantity of water vapor can be used but practically no further purification can be achieved with it.

The extraction preferably takes place with water vapor at normal pressure at a temperature of 106° to 150° C. Temperatures of 106° to 120° C. are especially preferred. Care must be taken that condensation of the acid vapors is avoided during the extraction.

It is also possible to work at less than one atmosphere and at a correspondingly lower temperature, where the temperature must be so selected that the acid vapors will not condense during the extraction. Likewise, extraction with water vapor is possible at a pressure which is higher than one atmosphere.

Here also, care must be taken that the acid vapors do not condense during the extraction. Working with excess or diminished pressure is, however, very seldom necessary because the temperature requirement of the organopolysiloxane oils is very low due to the short duration of the extraction.

In the method of the present discovery, we are concerned principally with a gas-fluid extraction. The method is, therefore, preferably carried out in such a manner that a maximum contact surface between gas and fluid is provided. The operation can take place in batches or continuously in a continuous current or countercurrent. Preferably, operation is carried out continuously in a countercurrent in a trickling column which is heated in order to avoid condensation of the water vapor and the acid vapor during the extraction.

It is also possible to use a system of a number of parallel columns or some which have been placed behind each other, blowing in the water vapor at a number of positions in the extraction apparatus or mixing it thoroughly with the organopolysiloxane oil in two-component nozzles and separating the vaporous acid and the low boiling siloxane at separate positions.

All low boiling components of the reaction mixture obtained from the hydrolysis are also removed by the water vapor simultaneously with the hydrogen halide. As a rule, this is of great advantage because a separate procedure was previously necessary for it. However, if this effect is not desired, these essentially water-insoluble components which will generally dissolve only 30 to 50 mg. hydrogen chloride per liter can be removed from the diluted HCl in simple separators and returned to the extraction apparatus at a suitable spot.

Because of the possibility of a continuous process for the extraction, the deacidification can be part of a completely continuous installation for the preparation of organopolysiloxane oils.

The following examples are included herein to aid those skilled in the art to better understand and practice this invention. The scope of the invention is delineated in the claims and is not restricted by the examples. The symbols Me, Ph, Vi, and Et represent the methyl, phenyl, vinyl and ethyl radicals respectively.

EXAMPLE 1

1,200 ml./hr. of a hydrolyzate prepared from 99.5 percent dimethyldichlorosilane, consisting of 77 percent by weight undistillable and 23 percent by weight distillable proportions and containing a total of 55.3 g./l. hydrogen chloride was extracted continuously in a glass trickling column heated by a jacket with 700 g./hr. of water vapor at normal pressure and a temperature of 112° C. The column had a working length of 160 cm. and a diameter of 5.5 cm. It was filled with 4 mm. by 4 mm. glass Raschig rings. 15 cm. above the lower column end a gas inlet tube was inserted through which the water vapor was added to the column. The jacket temperature was 115° C., the siloxane oil running off had a residual acid content of hydrogen chloride of 0.8 mg./l. 247.7 g., corresponding to 96 percent by weight of the readily volatile components, were blown out. They could be removed from the condensate as the upper layer from a separator succeeded by a cooler. The low boiling siloxanes which were blown out contained 47 mg./l. of HCl. The aqueous phase contained 94.5 g. HCl/l.

Control experiment 600 ml./hr. of the hydrolyzate of Example 1 were extracted with 770 l./hr. hot nitrogen in a countercurrent at 98° to 102° C. under the conditions of Example 1. The oil running off at the bottom of the column had an acid content of 10.65 to 11.65 g. HCl/l. 148 g./l., corresponding to 67 percent by weight of the readily volatile components, had been blown out.

EXAMPLE 2

1,200 ml. of the hydrolyzate obtained by the hyrdolysis of the mixture of 1.2 l. dimethyldichlorosilane, 4.5 phenylmethyldichlorosilane and 2.5 l. trimethylmonochlorosilane were extracted with 700 g./hr. water vapor at 195 mm. of Hg and a temperature of 90° C. under the conditions of Example 1. The hydrolyzate running in had an HCl content of 46.5 g./l., the siloxane oil running out 9.1 mg./l.

That which is claimed is:

1. Method of purifying organopolysiloxane oils obtained by the hydrolysis of organohalogensilanes with at least a stoichiometric amount of water, characterized in that the hydrogen halides, low boiling siloxanes and organic solvents present are removed simultaneously by extraction with water vapor.

2. Method according to claim 1 further characterized in that water vapor at a normal pressure and a temperature of 106° to 150° C. is employed.

3. Method according to claim 1 further characterized in that water vapor is used at reduced pressure.

4. The method of stabilizing and purifying fluid organosiloxane polymers comprising hydrolyzing and condensing organohalogenosilanes and subjecting the resulting reaction product to gas-fluid extraction by contacting the reaction product with water vapor at a temperature in the range from 106° to 150° C. employing 200 g. to 10 kg. of water vapor for each kg. of reaction product.

5. The method of claim 4 further characterized in that the gas-fluid extraction is carried out continuously employing a countercurrent of water vapor in a trickling column through which the reaction product is flowed.

6. The method of claim 4 further characterized in that the gas-fluid extraction is carried out by blowing the water vapor through a stream of the reaction product.

References Cited

UNITED STATES PATENTS 2,407,181  9/1946  Scott.

OTHER REFERENCES

Weissburger: "Techniques of Organic Chemistry," III, Interscience Publishers, N.Y. (1951), pp. 172–173.

DELBERT E. GANTZ, Primary Examiner

P. F. SHAVER, Assistant Examiner

U.S. Cl. X.R.

260—46.5, 448.8